United States Patent
Ishiyama et al.

[11] Patent Number: 5,955,798
[45] Date of Patent: Sep. 21, 1999

[54] LINEAR MOTOR

[75] Inventors: Masamitsu Ishiyama, Toyokawa; Makoto Izawa, Kariya; Toshio Kitaoka, Toyokawa; Yasuhiro Matsumoto, Toyokawa; Mitsutoshi Yagoto, Toyokawa, all of Japan

[73] Assignee: Minolta Co., Ltd., Osaka, Japan

[21] Appl. No.: 08/623,370

[22] Filed: Mar. 28, 1996

[30] Foreign Application Priority Data

Mar. 31, 1995 [JP] Japan .................................. 7-076616

[51] Int. Cl.$^6$ .................................................. H02K 41/00
[52] U.S. Cl. ................................................ 310/12; 310/14
[58] Field of Search ............................. 310/12, 13, 14; 318/135

[56] References Cited

U.S. PATENT DOCUMENTS

| | | | |
|---|---|---|---|
| 4,837,467 | 6/1989 | Newman | 310/12 |
| 4,922,143 | 5/1990 | Gosdowski et al. | 310/12 |
| 4,958,115 | 9/1990 | Miller | 318/662 |
| 5,081,381 | 1/1992 | Narasaki | 310/12 |
| 5,107,157 | 4/1992 | Ito | 310/12 |
| 5,179,304 | 1/1993 | Kenjo et al. | 310/23 |
| 5,191,377 | 3/1993 | Kagiura et al. | 355/235 |
| 5,225,725 | 7/1993 | Shiraki et al. | 310/12 |
| 5,229,670 | 7/1993 | Kagawa | 310/12 |
| 5,325,005 | 6/1994 | Denk | 310/68 |
| 5,332,955 | 7/1994 | Hopper | 318/632 |
| 5,338,121 | 8/1994 | Kobayashi et al. | 400/322 |
| 5,559,378 | 9/1996 | Oudet et al. | 310/17 |
| 5,571,284 | 11/1996 | Kawamichi et al. | 310/121 X |
| 5,587,636 | 12/1996 | Bar-Kana et al. | 318/561 |

FOREIGN PATENT DOCUMENTS

| | | |
|---|---|---|
| 53-147219 | 12/1978 | Japan . |
| 58-36162 | 3/1983 | Japan . |
| 59-121036 | 7/1984 | Japan . |
| 61-9161 | 1/1986 | Japan . |
| 62-207168 | 9/1987 | Japan . |
| 63-249459 | 10/1988 | Japan . |
| 2-65656 | 2/1990 | Japan . |
| 404150760 | 5/1992 | Japan ............... 310/13 |
| 6-225513 | 8/1994 | Japan . |
| 2235783 | 3/1991 | United Kingdom . |

OTHER PUBLICATIONS

Linear–Motion Electrical Machines by E.R. Laithwaite and S.A. Nasar Proceedings of the IEEE Ui 58, No. 4 Apr. 1970, pp. 531–542.

*Primary Examiner*—Clayton LaBalle
*Assistant Examiner*—Judson H. Jones
*Attorney, Agent, or Firm*—Burns, Doane, Swecker & Mathis, LLP

[57] ABSTRACT

A linear motor including a stator having a drive field magnet extending in a uniform direction, a movable piece including an armature coil opposed to the field magnet, and a carrying member carrying a predetermined portion of the stator, wherein the stator is provided with predetermined magnetic poles for driving the movable piece only at a range in which a change in the magnetic field by the influence of the carrying member is prevented or suppressed.

13 Claims, 5 Drawing Sheets

LINEAR MOTOR

BACKGROUND OF THE INVENTION

1. Field of the Invention

The present invention relates to a linear motor which includes a stator having a drive field magnet, i.e., field magnet for a driving purpose, extending in a uniform direction and a movable piece having an armature coil opposed to the field magnet, the stator being carried at its predetermined portion by a carrying member.

2. Description of the Background Art

Linear motors, each of which includes a stator having a drive field magnet extending in a uniform direction and a movable piece having an armature coil opposed to the field magnet, are disclosed, for example, in Japanese Laid-Open Patent Publication Nos. 61-9161 (1986) and 58-36162 (1983).

Figure 7A:
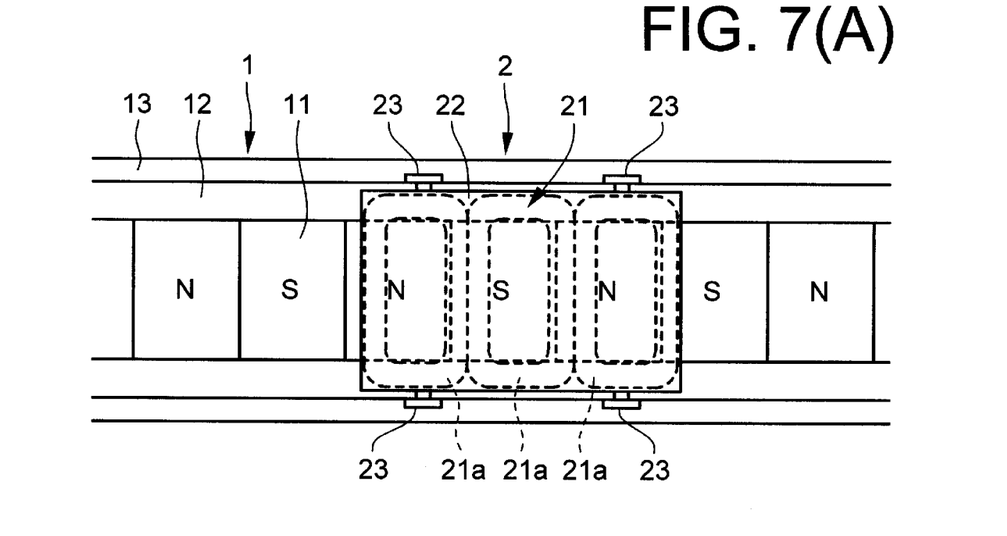
FIG. 7(A) is a plan schematically showing a prior linear motor.
Figure 7B:
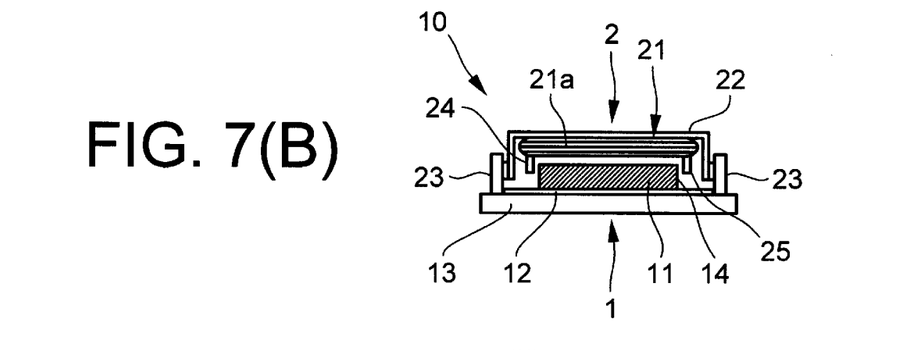
FIG. 7(b) is a schematic side view of the motor shown in FIG. 7(A)

The linear motor taught by Japanese Laid-Open Patent Publication No. 61-9161 is shown in FIGS. 7(A) and 7(B). This linear motor includes a plate-like stator 1 having a field magnet 11, which is provided at its surface with N- and S-poles arranged in a uniform direction, and a movable piece 2 having an armature coil 21 which is opposed to the field magnet 11.

The field magnet 11 in the stator 1 is carried by a stator yoke 12, which is mounted on a base 13.

The armature coil 21 of the movable piece 2 is formed of a plurality of air-core coils 21a, which have air-cores opposed to the field magnet 11 and are parallel to the field magnet 11, and are carried by a movable piece yoke 22. The movable piece yoke 22 has its opposite side ends which are bent downward and carry guide rollers 23. The guide rollers 23 are guided by the side surfaces of the stator yoke 12 for movement on the base 13.

As shown in FIG. 7(B), the armature coil 21 includes a position sensing element 24, which is operable to sense a magnetic force of the field magnet 11 at the position for controlling current supply to the coil, and a magnetic sensor 25 of an encoder provided for control of the speed of the movable piece and others. The position sensing element 24 is opposed to one of the side surfaces of the field magnet 11, and the magnetic sensor 25 is opposed to a fine magnet row 14 (i.e., a row of fine magnetized portions) which is formed at the other side surface of the field magnet 11. The sensors 24 and 25 are movable together with the movable piece 2 for sensing magnetism.

Figure 7C:
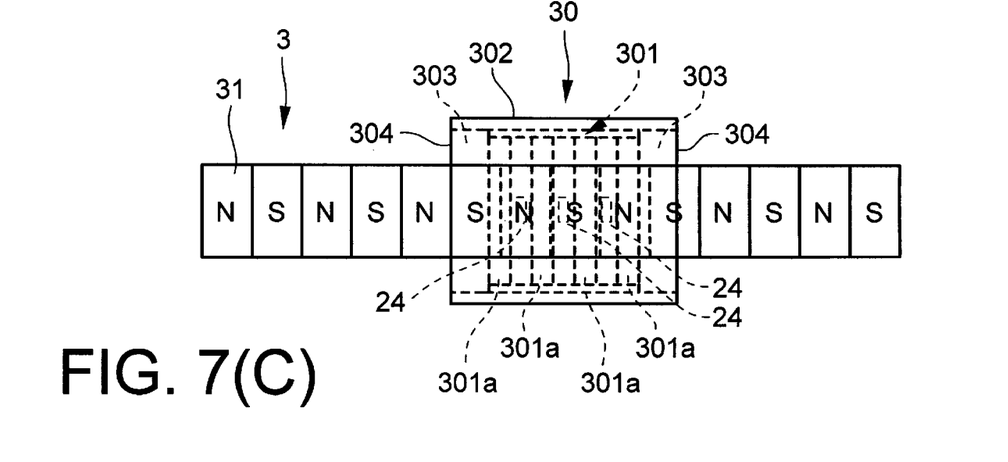
FIG. 7(C) is a schematic plan of another prior linear motor.

Meanwhile, the linear motor taught by Japanese Laid-open Patent Publication No. 58-36162 includes, as shown in FIG. 7(C), a rod-like stator 3 having a field magnet 31, which is provided at its surface with N- and S-poles arranged alternately in a uniform direction, and a cylindrical movable piece 30 fitted around the stator 3 and having an armature coil 301.

The armature coil 301 is formed of ring-like coils 301a fitted around the field magnet 31, and is attached to an inner side of a cylindrical movable piece yoke 302. In the example shown in FIG. 7(C), the cylindrical movable piece yoke 302 further includes bearings 303 fitted to opposite ends of the yoke 302, so that the movable piece 30 can move relatively along the stator 3. Various types of bearings other than the above bearings may be employed. The above publication discloses a structure, in which a plastic projection formed at the inner surface of the armature coil is slidably fitted into a longitudinal groove formed at the field magnet.

For the purpose of control of current supply to the armature coil 301, the movable piece 30 is provided with position sensing elements 24 such as a hall element for sensing a magnetic force of the field magnet at the position.

In the linear motor of the above type which includes the rod-like stator having the drive field magnet and extending in a uniform direction and the movable piece having the armature coil, which is fitted around the field magnet and is arranged inside the cylindrical movable piece yoke, the rod-like stator itself can be used as a guide member for the movable piece, and it is not necessary to add large or complicated guide means for the movable piece, so that the structure can be simple, and the operation accuracy is high. By these and other reasons, the linear motors of the above type have been employed in various equipments and instruments. For example, it has been attempted to use the above linear motor as a unit, which drives an optical scanning system for an image of a document or original in an image forming device such as a copying machine and an image reading device such as an image scanner.

As described above, the linear motor, which includes the rod-like stator having the drive field magnet and extending in a uniform direction and the movable piece having the armature coil fitted around the field magnet and arranged inside the cylindrical movable piece yoke, is utilized, for example, as a unit for driving the optical scanning system for a document image in the above image reading device. In this case, the movable piece is connected to a carriage, which carry a lighting lamp for a document image and/or a light reflecting mirrors, and the rod-like stator is usually carried at its opposite ends by carrying members, e.g., each made of a metal plate. Each region including the portion carried by the carrying member is provided with magnetic poles such as a field magnet for driving the movable piece.

As described above, the stator is provided even at the portions carried by the carrying members with the magnetic poles. Therefore, in a wide range including the portions which are in contact with the carrying members, the magnetic field of the drive field magnet or the like of the stator is increased or weaken by the influence of the carrying members. If the magnetic field of the field magnet causing a large magnetic force increases, torque ripple (so-called cogging) of the movable piece occurs. If it decreases, a sufficient force for driving the movable piece of the piece cannot be obtained, and thus the rapid increase and decrease of the speed cannot be performed. In the structure where the stator is provided with the fine magnet row for reading by the encoder, as employed in the linear motor shown in FIG. 7(B), an error occurs in its magnetism detection.

The above problem also arises in the following case. As exemplified in FIG. 7(A), the linear motor includes the plate-like stator having the field magnet extending in a uniform direction, the armature coil of the movable piece is arranged oppositely to the stator for driving the movable piece, and the stator is partially carried by the carrying member which exerts an influence on the magnetic field.

SUMMARY OF THE INVENTION

Accordingly, an object of the invention is to provide a linear motor, which includes a stator having a drive field magnet extending in a uniform direction, a movable piece including an armature coil opposed to the field magnet, and a carrying member carrying a predetermined portion of the stator, and in which the magnetic field by a magnetic pole row arranged at the stator is not substantially affected by the carrying member, and thus the movable piece can be accurately driven to perform an intended operation.

In order to achieve the above object, the invention provides a linear motor including a stator having a drive field magnet extending in a uniform direction, a movable piece including an armature coil opposed to the field magnet, and a carrying member carrying a predetermined portion of the stator, wherein the stator is provided with predetermined magnetic poles for driving the movable piece only at a range in which a change in the magnetic field by the influence of the carrying member is prevented or suppressed.

Only one carrying member carrying the stator, e.g., in a cantilever manner may be employed, or a plurality of carrying members carrying a plurality of portions of the stator may be also employed.

The magnetic poles for driving the movable piece are generally arranged at least in a range required for driving the movable piece, i.e., at least in a range over which the movable piece is to be driven. For example, if the movable piece is to be driven at a controlled moving speed, the above range contains a range over which the movable piece is to be driven at the controlled speed.

The foregoing "predetermined magnetic poles for driving the movable piece" include at least magnetic poles forming the field magnet for driving the movable piece, and may include, in addition to those for the field magnet, magnetic poles, if employed, for providing a magnetic force which is used for sensing a position of the movable piece so as to control current supply to the armature coil. If there is employed a fine magnet row (magnet pole row of a minute magnet pole pitch) which provides a magnetism to be read by an encoder provided, e.g., for controlling a speed of the movable piece, the foregoing "predetermined magnetic poles for driving the movable piece" also includes these magnetic poles.

The foregoing "range in which a change in the magnetic field by the influence of the carrying member is prevented or suppressed" means the following. For example, in the case where the stator is carried, e.g., at its one end or opposite ends by the carrying member(s) made of, e.g., a metal plate and affecting the magnetic field, and the movable piece is driven through a region except for a portion or portions of the stator carried by the carrying member(s), the foregoing range is a range, which does not contain the portion(s) of the stator carried by the carrying member(s), and can prevent or suppress the change of the magnetic field by the influence of the carrying member (in other words, can allow only negligible change). Therefore, in the motor where the stator is carried at its one or opposite ends by the carrying member (s), e.g., made of the metal plate, the magnetic poles of the field magnet or the like may be arranged in a region other than the end portion(s) of the stator.

In the linear motor according to the invention, the stator may include a rod-like member (e.g., a straight rod-like member having a circular section) made of a magnetizable material allowing machining, and may be formed by magnetizing the rod-like member.

In the structure employing the above stator, the rod-like stator can have a smoothened surface, which allows smooth movement of the movable piece with a reduced load.

In the structure employing the above stator, a stator yoke made of a ferromagnetic material may be inserted into a center of the rod-like member, and subsequently, the rod-like member may be magnetized. This stator is in contrast to a conventional stator, which is formed of a rod-like yoke and ring-like magnets fitted thereto to arrange N- and S-poles alternately. The conventional stator has an irregular surface, and it is difficult to smoothen precisely the irregular surface, because the machining or processing at a later step is difficult. Further, the irregularities cause a large load against the movable piece. Meanwhile, the stator of the invention described above can have the smooth surface. Also, magnetization can be performed strongly, because the magnetization is effected in a later step on the rod-like member having the ferromagnetic yoke inserted into the center of the member. These features increase the driving force.

Together with a stator including a ferromagnetic yoke inserted into a rod-like member provided with magnetic poles, as is done in the above stator, such a movable piece may be employed that includes a cylindrical movable yoke, made of a ferromagnetic material, which has at its inner side an armature coil opposed to the stator. By employing combination of the above stator and movable piece, a magnetic loop can be formed among the stator yoke, field magnet, armature coil and movable piece yoke, so that the magnetism can be effectively confined, which increases the magnetic flux density between the stator yoke and the movable piece yoke, resulting in a higher driving force.

According to the linear motor of the invention, the movable piece can move along the stator.

The predetermined magnet row such as the field magnet in the stator for driving the movable piece is arranged with respect to the carrying member in such a range in which a change of the magnetic field by the carrying member is prevented or suppressed. Therefore, the movable piece is driven while keeping a state that the magnetic field of the stator is not substantially affected by the carrying member, so that the movable piece is suppressed from cogging, and can be driven by the driving force with less change. In the structure where the fine magnet row providing the magnetism to be read by the encoder for controlling, e.g., a speed of the movable piece, an intended operation can be accurately performed while allowing the encoder to read the magnetism accurately.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will be described below with reference to the drawings. A linear motor of the embodiment to be described later is provided for driving a carriage, which carries a document image lighting lamp and light reflecting mirrors in an image scanning optical system of an image reading device. Naturally, the linear motor can be also used for driving a unit or a member other than the above.

Figure 1A:
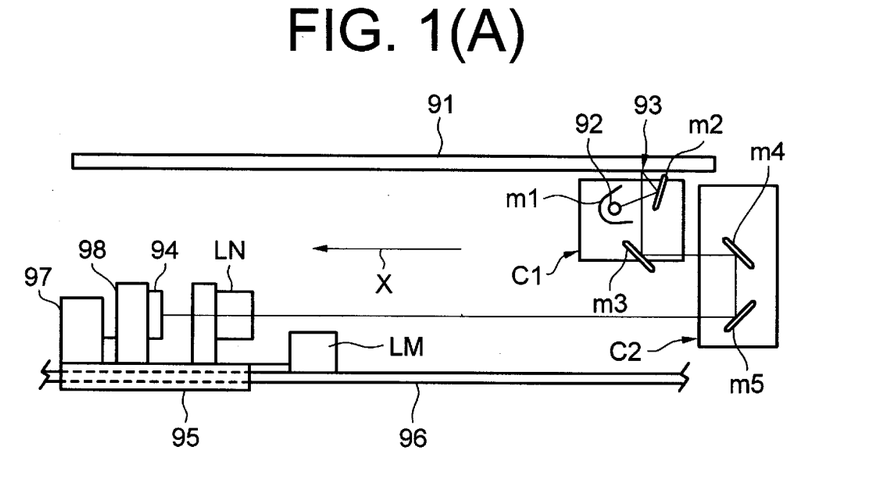
FIG. 1(A) schematically exemplifies a structure of an image reading device to which a linear motor of the invention is applied.

Now, an example of the image reading device will be described below. As shown in FIG. 1(A), a lighting lamp 92 is arrange under a document table glass 91 for bearing a document. Light beams from the lamp 92 are reflected by reflection mirrors m1 and m2 and are gathered at an image reading position 93 on the glass 91. Light beams reflected by the document are reflected by a mirror m3 and a set of mirrors m4 and m5, and are focused by a lens LN to form an image at a CCD camera 94 which is a linear camera element.

The lamp 92 and the mirrors m1, m2 and m3 are mounted on a movable carriage C1, and the mirrors m4 and m5 are mounted on a movable carriage C2. In the image reading operation, the carriage C1 moves to drive the lamp 92 and the mirrors m1, m2 and m3 in a secondary scanning direction X, and the carriage C2 moves to drive the mirrors m4 and m5 in the same direction X. In this operation, the lamp 92 and the mirrors m1, m2 and m3 are driven at a speed, of which ratio to the driving speed of the mirrors m4 and m5 is 2:1. Therefore, no change occurs in a distance from the image reading position 93 to the lens LN, and thus a focused state is maintained. The image formed at the CCD camera 94 is photoelectrically converted to send the same to an unillustrated image processing circuit. In this manner, the reading operation is completed.

The distance between the reading position 93 and the lens LN can be adjusted by moving a base 95 carrying the lens LN by a lens motor LM along a guide member 96 extending in the secondary scanning direction. The distance between the lens LN and the CCD camera 94 can be adjusted by moving a CCD camera mount 98, which is movable in the optical axis on the base 95, by a focusing motor 97 mounted on the base 95.

Figure 1B:
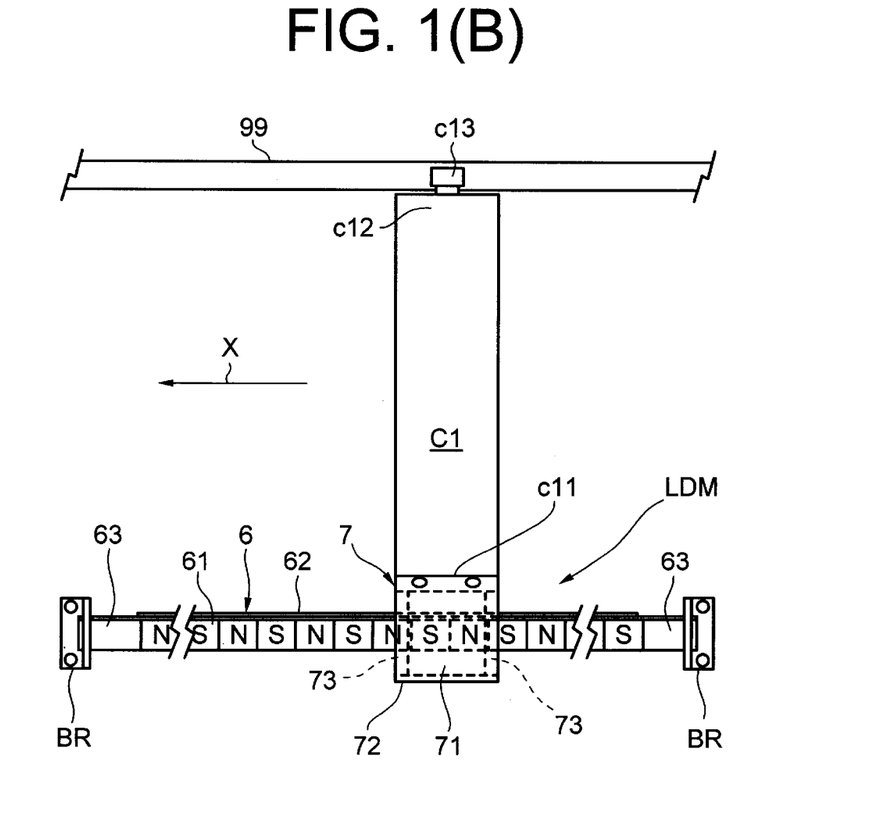
FIG. 1(B) is a fragmentary plan of a drive device of an document image scanning optical system shown in FIG. 1(A) and employing the linear motor of an embodiment of the invention.

In the above image reading device, a linear motor LDM according to the invention is employed for driving the carriage C1 as shown in FIG. 1(B). The carriage C2 can be also driven by such a linear motor.

The linear motor LDM includes a stator 6 of a straight rod-like form having a circular section and a movable piece 7. The stator 6 has a drive field magnet 61, which is provided at its surface with N- and S-poles arranged alternately to each other. The movable piece 7 can reciprocate along the stator 6.

The stator 6 is provided at its surface with a longitudinally extending fine magnet row 62, i.e., a row of fine magnetized portions, for reading by an encoder to be described later. Each end portion 63 of the stator 6 is carried by a carrying member BR, which is made of a metal plate and is fixed to a body of the image reading device. The opposite ends 63 of the stator 6 are not provided with a magnet pole. The field magnet 61 and others are arranged at a region of the stator 6 other than its end portions, as will be described later more in detail.

The movable piece 7 includes an armature coil 71, which is formed of a plurality of ring-like coils and is fitted around the stator 6 with a gap therebetween. The armature coil 71 is carried inside a cylindrical movable piece yoke 72. The movable piece yoke 72 is provided at its opposite ends with bearings 73, which allow sliding of the movable piece 7 on the stator 6.

In the illustrated embodiment, one end c11 of the carriage C1 is coupled to the movable piece 7, and a free end c12 of the carriage C1 can travel on a guide rail 99 by virtue of a slider or roller c13 arranged at the free end c12. The guide rail 99 is parallel to the stator 6.

As the movable piece 7 is driven along the stator 6 owing to the above structures, the carriage C1 can move in the secondary scanning direction X, and can also return to an initial position when the movable piece 7 is moved in a reverse direction. Although not shown, the carriage C2 is coupled to an unillustrated movable piece provided for the stator 6, and is driven similarly along the guide rail 99.

Figure 2:
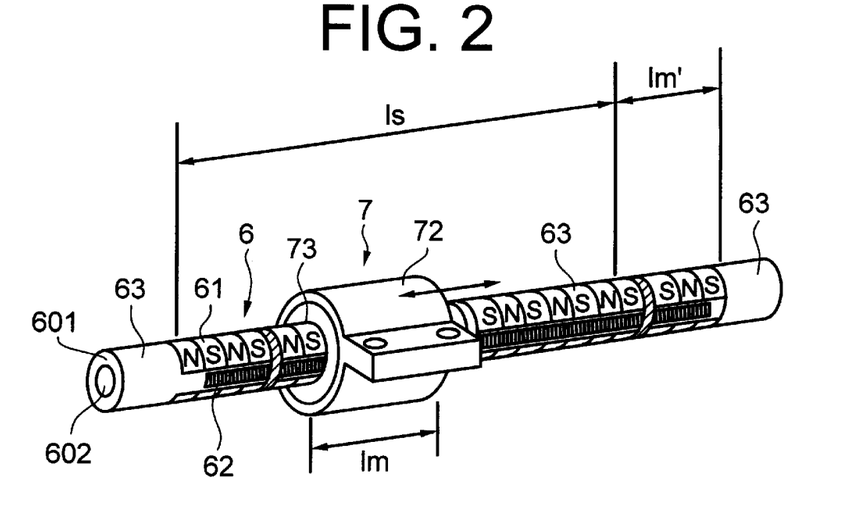
FIG. 2 is a perspective view of a stator and a movable piece of the linear motor shown in FIG. 1(B)
Figure 3:
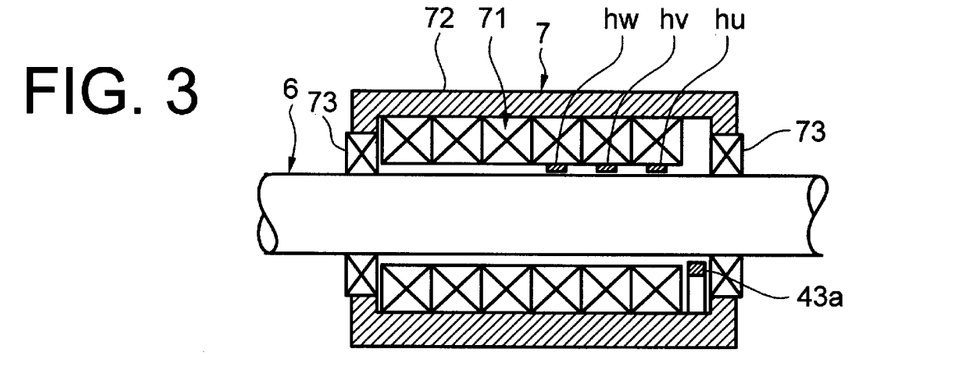
FIG. 3 shows a section of the movable piece of the linear motor shown in FIG. 1(B) together with the stator.
Figure 4A:
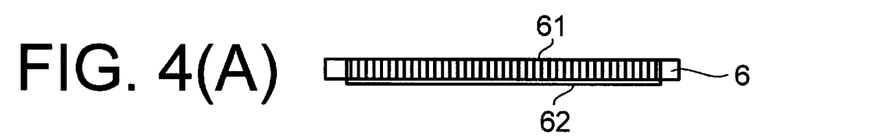
FIGS. 4(A) and 4(B) each show a relationship in length between a field magnet for driving a movable piece and a fine magnet row for encoder reading in a stator of the linear motor of the invention.
Figure 4B:
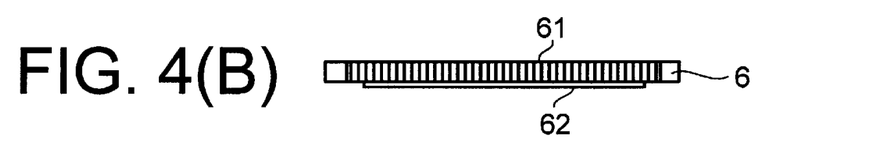
Figure 5A:
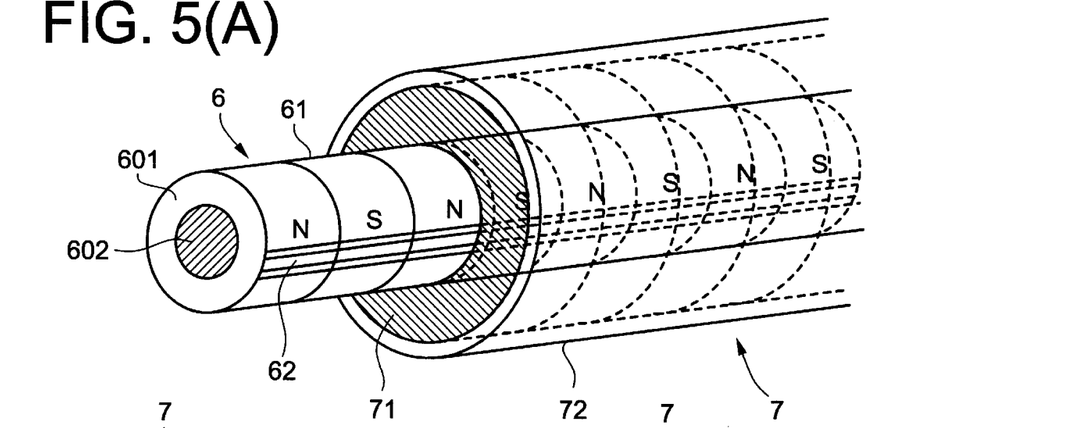
FIG. 5(A) shows structures of the stator and movable piece in the linear motor shown in FIG. 1(B)
Figure 5B:
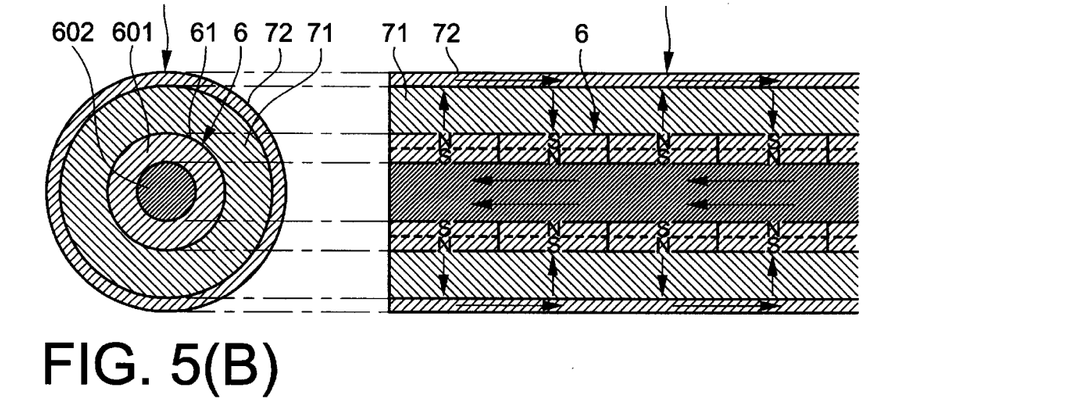
FIG. 5(B) shows a state of a magnetic loop in the structures of the stator and movable piece shown in FIG. 5(A)
Figure 5C:
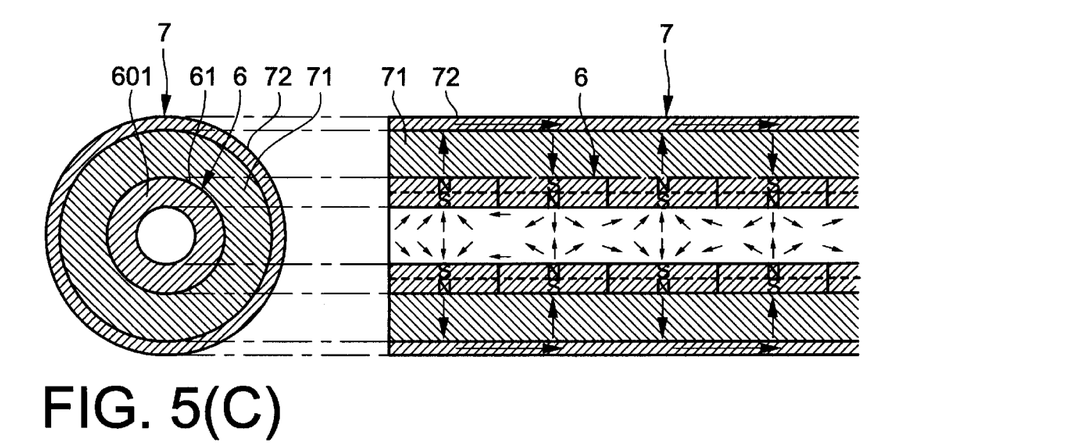
FIG. 5(C) shows a state of a magnetic loop in the case where a stator yoke made of a ferromagnetic material is not arranged at a center of the stator.

Referring to FIGS. 2 to 5(C), the stator 6 and the movable piece 7 will be described below more in detail. FIG. 2 is a perspective view of the stator 6 and the movable piece 7 of the linear motor LDM shown in FIG. 1(B). FIG. 3 shows a section of the movable piece 7 of the linear motor LMD together with the stator 6. FIGS. 4(A) and 4(B) each show a relationship in length between the field magnet 61 for driving the movable piece 7 in the stator 6 and the fine magnet row 62 for reading by the encoder. FIG. 5(A) shows structures of the stator 6 and movable piece 7, FIG. 5(B) shows a state of a magnetic loop in the structures of the stator 6 and movable piece 7, and FIG. 5(C) shows a state of a magnetic loop in the case where a stator yoke made of a ferromagnetic material is not arranged at a center of the stator 6.

The stator 6 is formed as follows. As shown in FIGS. 2 and 5(A), a rod-like stator yoke 602 made of a ferromagnetic material is inserted into a center of a magnetizable straight rod-like member 601 having a circular section and a machined smooth surface. Subsequently, the rod-like member 601 is magnetized to form the field magnet 61 and specifically to arrange N- and S-poles which are arranged alternately to each other in the secondary scanning direction X with a pitch of 60 mm. Also, the rod-like member 601 is magnetized to form the fine magnet row 62 for reading by the encoder and specifically to arrange N- and S-poles alternately to each other in the longitudinal direction with a small pitch (about 50 $\mu$m). Both of the field magnet 61 and the fine magnet row 62 are formed to have a distribution of magnetic flux density in a sinusoidal wave form of which one cycle contains one N-pole and one S-pole.

The structure of the stator 6 is not restricted to the above. However, according to the above structure which is formed by inserting the stator yoke made of the ferromagnetic material into the center of the magnetizable rod-like member having a machined smooth surface, and by subsequently magnetizing the rod-like member to form the field magnet or the like, it is easy to provide the stator with the smooth surface for reducing a sliding resistance of the movable piece. Also, owing to the fact that magnetization is effected on the rod-like member having the ferromagnetic yoke inserted into the center thereof, a high magnetic flux can be obtained, and thus a high driving force can be obtained.

In the illustrated embodiment, the magnetization is performed as described above, and more specifically, the field magnet 61 and the fine magnet row 62 are formed by magnetizing independent regions. However, both may be magnetized in an overlapped fashion, or magnetization may be performed by independently forming the magnet rows on independent members and subsequently, for example, attaching them to the surface of the rod-like member.

As shown in FIGS. 2 and 3 and also as explanatorily illustrated in FIGS. 5(A) and 5(B), the movable piece 7 has such a structure that the armature coil 71 is arranged along the inner side of the cylindrical movable piece yoke 72 also serving as a housing, and is opposed to the field magnet 61 of the stator 6 with a small gap therebetween. The foregoing bearings 73 are arranged at the opposite ends of the movable piece yoke 72.

The armature coil 71 is formed of three-phase ring-shaped coils u, v and w which are shifted from each other by an electrical angle of $\pi \cdot \frac{2}{3}$ (or may be arranged at positions of the same phases as those shifted from each other by $\pi \cdot \frac{2}{3}$). The u-phase coil is provided with a hall element hu which is a kind of magnetoelectric element and is used as a position sensing element. The v-phase coil is provided with a hall element hv similar to the above. The w-phase coil is provided with a hall element hw similar to the above. These hall elements are opposed to the field magnet 61. The movable piece yoke 72 is provided with a magnetic sensor (i.e., magnetic resistor element called an MR element in this embodiment) 43a opposed to the fine magnet row 62.

As described above, the movable piece yoke 72 is made of the ferromagnetic material, and the armature coil 71 opposed to the stator 6 is arranged inside the yoke 72. By combination of the movable piece 7 having this structure and the stator 6 having the foregoing structure, a magnetic loop can be formed among the stator yoke 602, field magnet 61, armature coil 71 and movable piece yoke 72 as shown in FIG. 5(B), whereby a magnetism is confined and a magnetic flux density between the stator yoke 602 and the movable piece yoke 72 increases, and thus a higher driving force can be obtained. If the ferromagnetic material were not arranged at the core of the stator 6, the magnetic flux at a cavity would irregularly disperse, and naturally the magnetic flux density would be weak.

As an important point, the field magnet 61 and the fine magnet row 62 in the stator 6 are not arranged at the opposite end portions 63 of the stator 6. The field magnet 61 and the fine magnet row 62 are arranged in a range required for driving the movable piece 7, and more specifically in such a range that prevents or suppresses change of the magnetic field of the field magnet 61 and the fine magnet row 62 by the stator carrying members BR (in other words, a range that prevents the change or allows only negligible change). The fine magnet row 62 may be arranged over the same length as the field magnet 61, as shown in FIG. 4(A). Alternatively, as shown in FIG. 4(B), it may be arranged only over a required length which is contained in a range of the length of the field magnet 61 and is shorter than the same. In the embodiment shown in FIG. 2, it is arranged as shown in FIG. 4(B).

In the embodiment shown in FIG. 2, the length of the field magnet 61 for driving the movable piece is equal to a sum of a stroke (ls) of the motor and a length (lm'). The length (lm') is equal to [(a length (lm) of the movable piece in the moving direction) X (the number of the movable piece(s))]. The length of the fine magnet row 62 is shorter than the above length (ls+lm') and is equal to [the stroke length (ls)–the length (lm) of the movable piece].

As described above, the drive field magnet 61 and the fine magnet row 62 for the encoder are arranged in the range in which a change of their magnetic field by the influence of the stator carrying members BR is prevented or suppressed, so that the movable piece 7 is driven while keeping such a state that the magnetic field of the field magnet 61 is not substantially affected by the carrying members BR. Thereby, the movable piece 7 is suppressed from cogging, so that the movable piece 7 is smoothly driven with less change in the movable piece driving force, and the magnetic sensor 43a of the encoder can accurately read the magnetism of the fine magnet row 62. In this manner, the movable piece can be operated with an intended accuracy, and the image reading operation can be performed accurately.

Since the stator 6 is attached to the carrying members BR at its opposite end portions 63 which are not magnetized, attachment to the carrying members can be performed easily.

As compared with the case where the stator 6 is magnetized over its entire length, the processing time can be reduced, and a yield in the machining and processing is improved, so that the manufacturing cost can be reduced. In particular, the fine magnetization is a magnetizing processing with a fine or minute pitch, so that the fact that the stator is not finely magnetized over its entire length can achieve a remarkable effect in cost reduction.

Since the field magnet 61 and the fine magnet row 62 are formed at a member (i.e., stator 6 in this embodiment) guiding the movable piece 7, the number of components of the motor can be reduced. Further, adjustment of relative positions of the respective components is not required or performed very easily.

Description will now be given on an operation control of the linear motor LDM described above.

As already described, the field magnet 61 of the stator 6 is magnetized to have a distribution of the magnetic flux density in a sinusoidal wave form of which one cycle contains one N-pole and one S-pole. As described before, the armature coil 71 of the movable piece 7 is formed of the three-phase coils u, v and w which are shifted from each other by an electrical angle of $\pi \cdot \frac{2}{3}$ (or may be arranged at positions of the same phases as those shifted from each other by $\pi \cdot \frac{2}{3}$). The movable piece 7 is provided with the hall elements hu, hv and hw. Each hall element in this embodiment senses the magnitude and direction of the magnetic flux of the field magnet 61 at its position.

The hall element hu is arranged at the central position of the coil u. Similarly, the hall element hv is arranged at the central position of the coil v, and the hall element hw is arranged at the central position of the coil w. Each of the hall element senses the magnitude and direction of the magnetic flux, and a current corresponding to the sensed magnitude and direction is supplied to the coil, whereby the motor LDM is driven. Thus, this embodiment employs a so-called three-phase driving system in which signals shifted from each other by a phase of 120 degrees are supplied to the coils, and consequently a constant driving force can be produced regardless of the position of the movable piece 7. In this embodiment, the three-phase driving system is employed, and the movable piece 7 is to be driven at an intended speed. For this purpose, a phase-locked-loop servocontrol system generally called a PLL is employed.

Figure 6A:
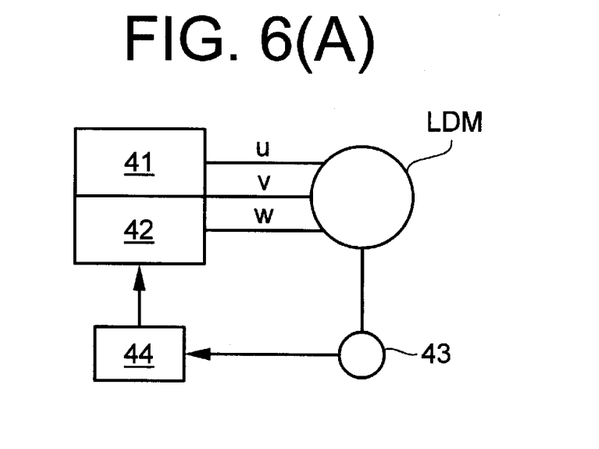
FIG. 6(A) is a schematic block diagram of an operation control circuit for the linear motor shown in FIG. 1(B)
Figure 6B:
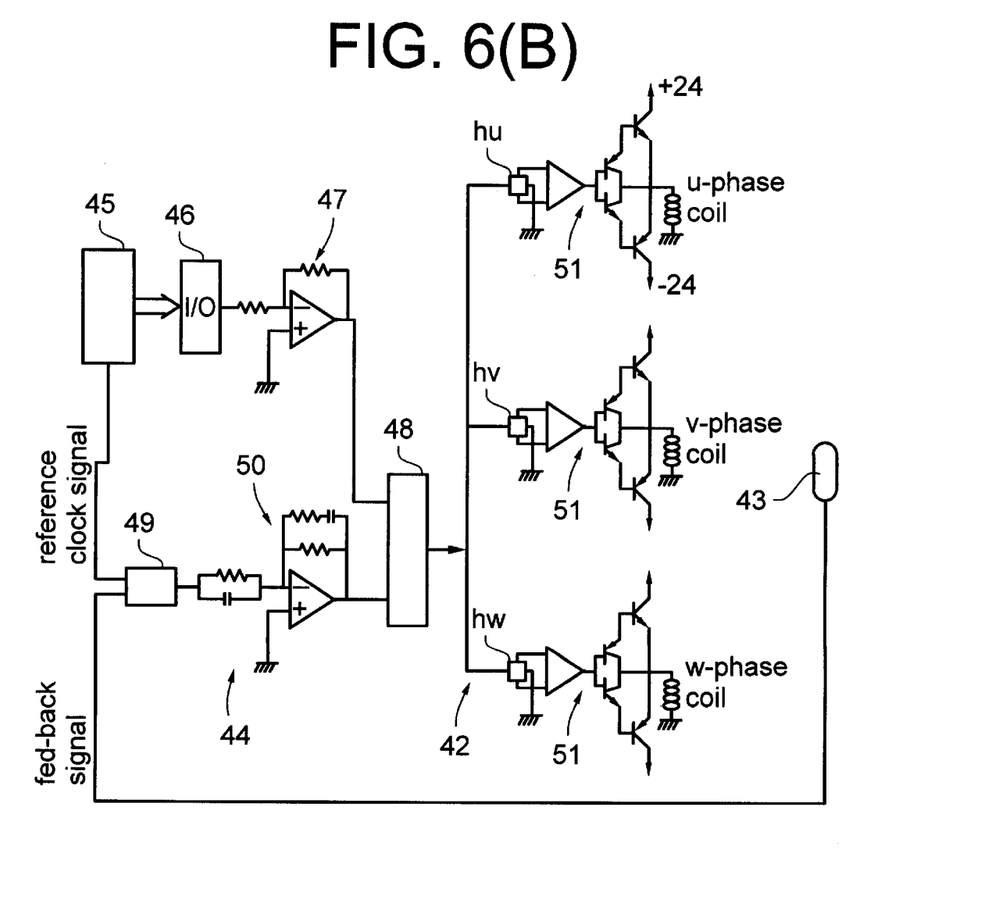
FIG. 6(B) shows a major portion of the operation control circuit including a speed control circuit performing phase-locked-loop servocontrol.

FIG. 6(A) is a schematic block diagram of an electric circuit for controlling the operation of the motor LDM, and FIG. 6(B) shows a major portion of the operation control circuit including a speed control circuit performing the PLL servocontrol.

In FIGS. 6(A) and 6(B), 41 indicates a DC source, 42 indicates a current supply control circuit including the hall elements and others, and 43 indicates an encoder for sensing a moving speed of the movable piece 7. The encoder 43 includes the magnetic sensor 43a. 44 indicates a speed controller performing the phase -locked-loop servocontrol. The encoder 43 is an encoder of a magnetic type, in which the magnetic sensor 43a on the movable piece 7 reads the magnetism of the fine magnet row 62 on the stator 6.

In FIG. 6(B), 45 indicates a computer, which instructs an intended operation of the motor LDM for image reading and sends a reference clock signal to a phase synchronous controller 49. 46 indicates an input/output port of the computer 45, 47 indicates an amplifier, and 48 indicates a switching unit. 49 indicates the phase synchronous controller, 50 indicates a compensation circuit, and 51 indicates an amplifier circuit.

According to the control circuit shown in FIGS. 6(A) and 6(B), the computer 45 supplies the reference clock signal corresponding to an intended speed to the phase synchronous controller 49, and the moving speed signal of the moving piece 7 is fed back from the encoder 43 to the controller 49. The phase synchronous controller 49 issues a signal depending on differences in the frequency and phase between the pulse of the reference clock and the pulse of the signal fed back from the encoder 43. The compensation circuit 50 compensates gaining or losing in a transferring system to output a voltage which is used as a reference input voltage of the hall elements. Each hall element, which is already described, outputs a voltage corresponding to the magnitude and direction of the magnetic flux at its position, and the output voltage from the hall element has such characteristic that it is proportional to the reference input voltage. Accordingly, the output voltages corresponding to the reference clock signal and the fed-back signal are produced from the hall elements. The output voltage from the hall element is proportionally amplified by the amplifier circuit 51, and the current is supplied to the armature coil. In this manner, the pulse of the reference clock and the pulse of the feedback signal are processed to have the equal frequency and the equal phase. In other words, the motor LDM is operated to attain the intended speed of the movable piece 7.

The invention is not restricted to the above embodiments. For example, elimination of the magnet pole row may be applied only to one stator end portion corresponding to one of the carrying members BR provided that any problem does not occur. Means for guiding the travel of the movable piece 7 may be provided independently from the stator 6.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A linear motor including a stator having a drive field magnet extending in a uniform direction, a movable piece including an armature coil opposed to said field magnet, and a carrying member carrying a portion of said stator, wherein said stator is provided with magnetic poles for driving said movable piece, said magnetic poles being located relative to said carrying member so that said movable piece is drivable only at a range in which a change in the magnetic field by the influence of said carrying member is prevented or suppressed.

2. The linear motor according to claim 1, wherein said carrying member is made of a metal plate.

3. The linear motor according to claim 1, wherein said magnetic poles of said stator include magnetic poles forming said drive field magnet and a fine magnet row.

4. A linear motor comprising:

a stator extending in a uniform direction and provided at a region except for its end portion with a drive field magnet;

a movable piece including an armature coil opposed to said field magnet; and a carrying member carrying said end portion of said stator, said drive field magnet being located relative to said carrying member so that said movable piece is drivable only at a range in which a change in the magnetic field by the influence of said carrying member is prevented or suppressed.

5. The linear motor according to claim 4, wherein said carrying member is made of a metal plate.

6. The linear motor according to claim 4, wherein said stator is provided at a region except for said end portion with a fine magnet row.

7. A linear motor comprising:

a stator including a straight rod-like member having a circular section and having a magnetized portion at a region except for its end portion in the longitudinal direction of the member, and a stator yoke made of a ferromagnetic material and inserted into a center of said straight rod-like member;

a movable piece formed of an armature coil fitted around said straight rod-like member, and a movable piece yoke made of a ferromagnetic material and surrounding said armature coil; and a carrying member carrying said end portion of said straight rod-like member.

8. The linear motor according to claim 7, wherein said carrying member is made of a metal plate.

9. The linear motor according to claim 7, wherein said straight rod-like member is provided at a region except for said end portion with a drive field magnet and a fine magnet row formed by magnetization.

10. The linear motor according to claim 1, wherein the stator includes two end portions, the magnetic poles being located solely between the end portions, the carrying member carrying the two end portions of the stator.

11. A linear motor comprising:

a stator including a straight rod-like member having a circular section and having a magnetized portion at a region except for its end portion in the longitudinal direction of the member;

a movable piece formed of an armature coil fitted around said straight rod-like member; and a carrying member carrying said end portion of said straight rod-like member, said magnetized portion being located relative to said carrying member so that said movable piece is drivable only at a range in which a change in the magnetic field by the influence of said carrying member is prevented or suppressed.

12. The linear motor according to claim 11, wherein said carrying member is a metal plate.

13. The linear motor according to claim 11, wherein said straight rod-like member is provided at a region except for said end portion with a drive field magnet and a fine magnet row.

* * * * *